US009163433B2

(12) United States Patent
Sedon

(10) Patent No.: US 9,163,433 B2
(45) Date of Patent: Oct. 20, 2015

(54) DISPLAY STAND FOR A TABLET COMPUTER

(71) Applicant: InVue Security Products Inc., Charlotte, NC (US)

(72) Inventor: Nicholas M. Sedon, Weddington, NC (US)

(73) Assignee: InVue Security Products Inc., Charlotte, NC (US)

( * ) Notice: Subject to any disclaimer, the term of this patent is extended or adjusted under 35 U.S.C. 154(b) by 83 days.

(21) Appl. No.: 14/059,735

(22) Filed: Oct. 22, 2013

(65) Prior Publication Data

US 2014/0118930 A1 May 1, 2014

Related U.S. Application Data

(60) Provisional application No. 61/720,541, filed on Oct. 31, 2012.

(51) Int. Cl.
*G06F 1/16* (2006.01)
*E05B 73/00* (2006.01)
*G06F 21/88* (2013.01)

(52) U.S. Cl.
CPC ............ *E05B 73/0082* (2013.01); *G06F 21/88* (2013.01); *Y10T 29/49826* (2015.01)

(58) Field of Classification Search
CPC .............................. G06F 21/88; E05B 73/0082
USPC ......................................... 361/679.57; 70/58
See application file for complete search history.

(56) References Cited

U.S. PATENT DOCUMENTS

| 5,757,616 A | 5/1998 | May et al. |
| 5,966,285 A | 10/1999 | Sellers |
| 6,212,921 B1 * | 4/2001 | Knighton ........................ 70/58 |
| 6,581,420 B1 * | 6/2003 | Ling et al. ........................ 70/58 |
| 6,711,921 B1 * | 3/2004 | Yang ................................ 70/58 |
| 7,007,912 B1 * | 3/2006 | Giuliani et al. ............... 248/552 |
| 7,352,567 B2 | 4/2008 | Hotelling et al. |
| 7,499,270 B2 * | 3/2009 | Allen ....................... 361/679.56 |
| 7,598,842 B2 | 10/2009 | Landram et al. |
| 7,609,512 B2 | 10/2009 | Richardson et al. |
| 7,866,623 B2 * | 1/2011 | Lampman et al. ............ 248/551 |
| 7,907,394 B2 | 3/2011 | Richardson et al. |
| D663,972 S * | 7/2012 | Alexander et al. ............ D6/466 |
| 8,250,278 B2 | 8/2012 | Tseng et al. |
| 8,369,082 B2 * | 2/2013 | Madonna et al. ........ 361/679.41 |
| 8,418,514 B1 * | 4/2013 | Su .................................... 70/58 |
| 8,427,328 B1 * | 4/2013 | Leblang ....................... 340/635 |

(Continued)

OTHER PUBLICATIONS

Dong Yun Lee, International Search Report, Feb. 10, 2014, pp. 1-11, Korean Intellectual Property Office, Republic of Korea.

(Continued)

*Primary Examiner* — Adrian S Wilson
(74) *Attorney, Agent, or Firm* — InVue Security Products Inc.

(57) ABSTRACT

Embodiments of the present invention are directed to a display stand for securing a tablet computer from unauthorized removal or theft. The display stand may include a sleeve configured to at least partially receive a tablet computer therein and a base configured to releasably engage the sleeve. The base may be configured to engage the sleeve in a locked configuration so as to prevent removal of the sleeve and the tablet computer from the base and to disengage the sleeve in an unlocked configuration so as to allow the sleeve and the tablet computer to be removed from the base.

24 Claims, 6 Drawing Sheets

(56) References Cited

U.S. PATENT DOCUMENTS

| | | | |
|---|---|---|---|
| 8,456,836 B2 * | 6/2013 | Allen et al. | 361/679.57 |
| D686,629 S * | 7/2013 | Trinh et al. | D14/447 |
| D696,259 S * | 12/2013 | Howarth et al. | D14/447 |
| 8,649,169 B2 * | 2/2014 | Kwon et al. | 361/679.41 |
| 8,814,128 B2 * | 8/2014 | Trinh et al. | 248/551 |
| 8,869,573 B2 * | 10/2014 | Myers et al. | 70/58 |
| 8,881,560 B2 * | 11/2014 | Avganim | 70/57.1 |
| 9,078,350 B1 * | 7/2015 | Phillips | |
| 2003/0235029 A1 * | 12/2003 | Doherty | G06F 1/1632 361/679.27 |
| 2004/0177658 A1 * | 9/2004 | Mitchell | 70/58 |
| 2005/0039502 A1 * | 2/2005 | Avganim | 70/58 |
| 2005/0178173 A1 * | 8/2005 | Kuo | 70/58 |
| 2006/0066438 A1 | 3/2006 | Altounian et al. | |
| 2008/0209965 A1 | 9/2008 | Maack | |
| 2008/0266089 A1 | 10/2008 | Haren et al. | |
| 2009/0158423 A1 | 6/2009 | Orlassino et al. | |
| 2010/0118144 A1 * | 5/2010 | Fawcett et al. | 348/143 |
| 2010/0147041 A1 | 6/2010 | Teicher et al. | |
| 2011/0047844 A1 * | 3/2011 | Fawcett et al. | 40/642.02 |
| 2011/0080137 A1 * | 4/2011 | Avganim | 320/115 |
| 2011/0278885 A1 * | 11/2011 | Procter et al. | 297/135 |
| 2012/0026684 A1 | 2/2012 | Matthews | |
| 2012/0175474 A1 | 7/2012 | Barnard et al. | |
| 2012/0182680 A1 | 7/2012 | Wetzel et al. | |
| 2012/0234055 A1 | 9/2012 | Bland, III et al. | |
| 2012/0307448 A1 * | 12/2012 | Allen | 361/679.57 |
| 2013/0026322 A1 | 1/2013 | Wheeler et al. | |
| 2013/0058023 A1 | 3/2013 | Supran et al. | |
| 2013/0107449 A1 | 5/2013 | Su et al. | |
| 2014/0362517 A1 * | 12/2014 | Moock et al. | 361/679.43 |

OTHER PUBLICATIONS

Vanguard Protex Global, Inc., "Volt the Power to Inspire Awe", Jun. 8, 2012, pp. 1-2.

Archelon, "Archelon Keep Your Tablets Safe", Dec. 3, 2011, pp. 1-2.

Ewan, "iPad Enclosures to Help Lock-Down iPads for Public Use", "Mobile Industry Review News and Opinion for Industry Executives and Mobile Fanatics", Feb. 6, 2011, pp. 1-6.

Armor Active, "Locking iPad 2 Kiosk Tradeshow Exhibit". May 2011, pp. 1-4.

* cited by examiner

DISPLAY STAND FOR A TABLET COMPUTER

CROSS REFERENCE TO RELATED APPLICATIONS

This non-provisional utility patent application claims the benefit of priority of U.S. Provisional Application No. 61/720,541, filed on Oct. 31, 2012, entitled IPAD LOCKING AND DOCKING STAND, which is hereby incorporated by reference in its entirety.

FIELD OF THE INVENTION

Embodiments of the present invention relate generally to a display stand for securing a tablet computer from theft or removal.

BACKGROUND OF THE INVENTION

Security stands, also commonly referred to as "kiosk" stands, are known for securing a tablet computer in a manufacturing, retail or office environment. A tablet computer security stand commercially known as VOLT™ is available from Vanguard Protex Global, Inc. (VPG). The VOLT™ security stand comprises a display pedestal and a disconnect sensor configured to be attached to the tablet computer and removably supported on the pedestal. The VOLT™ security stand may also include means for providing power and/or charging the tablet computer through a power adapter cord, and may be electrically connected to an alarm module containing monitoring electronics for activating san alarm in the event that the tablet computer is detached from the disconnect sensor. The disconnect sensor of the VOLT™ security stand, however, does not comprise a sleeve that is configured to enclose a tablet computer, such as, an Apple® iPad® tablet computer.

An enclosure for an iPad® tablet computer commercially known as the Archelon™ iPad Enclosure includes an inner frame configured to receive an iPad® and an outer frame that is secured to the inner frame by mechanical fasteners. The inner frame is movably mounted on a kiosk stand such that the frame and the iPad® can be tilted, rotated 180 degrees and/or angled as desired.

An enclosure for an iPad® tablet computer commercially known as the Jacket iPad® Enclosure includes a two-piece frame that is secured and locked around an iPad tablet computer with a barrel lock and key. The Jacket iPad® Enclosure may be supported on and locked to an optional mount.

BRIEF SUMMARY OF THE INVENTION

Embodiments of the present invention are directed to a display stand for securing a tablet computer from unauthorized removal or theft. The display stand may include a sleeve configured to at least partially receive a tablet computer therein and a base including a lock configured to releasably engage the sleeve. The base may be configured to engage the sleeve in a locked configuration so as to prevent removal of the sleeve and the tablet computer from the base and to disengage the sleeve in an unlocked configuration so as to allow the sleeve and the tablet computer to be removed from the base.

In some embodiments, the sleeve comprises a first portion and a second portion that are configured to engage one another to secure the tablet computer therein. The tablet computer may include opposing sides extending between opposing ends, and the first portion and the second portion may each comprise peripheral sides and a peripheral end configured to overlie and enclose the opposing sides and one of the opposing ends.

According to one aspect, the sleeve comprises a locking lug configured to releasably engage the base. The base may include a recess configured to at least partially receive the locking lug therein. The base may include at least one locking stud configured to releasably engage the locking lug. The locking lug may include a groove configured to be releasably engaged by the at least one locking stud. In one example, the at least one locking stud is configured to be mechanically biased into engagement with the locking lug.

In other embodiments, the base comprises a lock configured to cooperate with a key for locking and/or unlocking the sleeve and tablet computer from the base. The lock may include a mechanical lock configured to cooperate with a key or an electronic lock configured to communicate with an electronic key. The electronic lock may be configured to receive electrical power from the electronic key for operating the electronic lock. In one embodiment, the electronic lock comprises a security code, and the electronic lock is configured to unlock in response to receiving a matching security code from the electronic key. In some embodiments, the display stand also includes an alarm unit disposed within the base, wherein the alarm unit is configured to activate an alarm in the event that the sleeve and the tablet computer are removed from the base in an unauthorized manner. The alarm unit may be configured to communicate with an electronic key for arming or disarming thereof. Moreover, the base may include means for charging the tablet computer or transferring power to the tablet computer.

In another embodiment, a display stand for securing a tablet computer from unauthorized removal or theft is provided. The display stand includes a sleeve configured to at least partially receive a tablet computer therein and a base configured to releasably engage the sleeve. The display stand also includes a lock configured to lock the sleeve and the tablet computer to the base so as to prevent removal of the sleeve and the tablet computer from the base. In addition, the display stand includes a key configured to unlock the lock so as to allow the sleeve and the tablet computer to be removed from the base.

According to one embodiment, a method for securing a tablet computer from unauthorized removal or theft is provided. The method includes positioning a tablet computer within a sleeve and locking the sleeve and the tablet computer to the base so as to prevent removal of the sleeve and the tablet computer from the base. The method further includes unlocking the lock with a key so as to allow the sleeve and the tablet computer to be removed from the base. In some embodiments, the method also includes displaying the sleeve and the tablet computer in one of a plurality of predetermined display orientations. The unlocking step may include unlocking the lock with an electronic key.

BRIEF DESCRIPTION OF THE DRAWINGS

FIG. 3 further shows a programmable electronic key for locking the sleeve containing the tablet computer to the base and for subsequently unlocking the sleeve and the from the base.

DETAILED DESCRIPTION

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention are directed to a merchandise display security stand for a tablet computer such as, for example, an iPad® manufactured and offered for sale by Apple, Inc. The security stand includes a sleeve configured to enclose the tablet computer and a base operable for releasably attaching the sleeve to the base. The base may include an alarm and monitoring electronics for activating the alarm in the event that the tablet computer and the security sleeve are detached from the base. The base may further include means for charging the internal battery of the tablet computer, for example, by contact or inductive charging.

In some embodiments, the invention is a merchandise display security stand, or kiosk stand, for an iPad® tablet computer manufactured and sold by Apple, Inc. The display stand includes a sleeve configured to receive the tablet computer and to lock the sleeve and the tablet computer to a base in a desired orientation. The base may include an alarm and monitoring electronics for activating the alarm in the event that the sleeve and the tablet computer are detached from the base. The display stand may further include means for charging the internal battery of the tablet computer and/or for providing operating power to the tablet computer, for example, by contact or inductive charging. The display stand may be used in any retail, manufacturing, or office environment for mounting the tablet computer in a convenient orientation for use by employees and/or customers, while securing the iPad against theft or removal. Although reference is made herein to an iPad® tablet computer, it is understood that the sleeve is adaptable to tablet computers made by other manufacturers (e.g., Microsoft Surface tablet, Samsung Galaxy Note tablet, etc.). Moreover, although the term "sleeve" is used herein, it is understood that term is not intended to be limiting and may be any sleeve, shroud, or the like configured to receive a tablet computer operably engage a baseFki.

Figure 1:
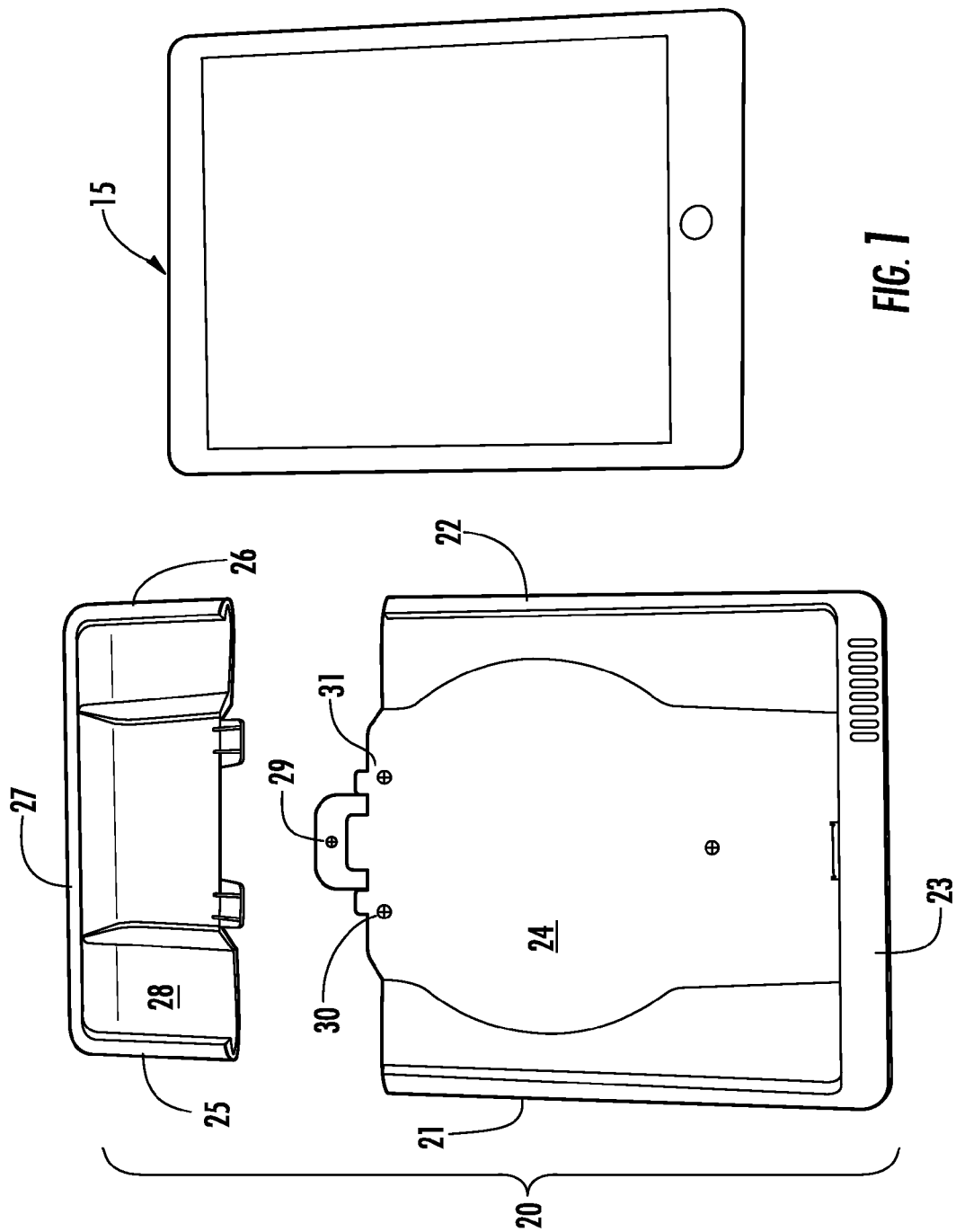
FIG. 1 is a top view showing the two-piece sleeve of a security stand and a tablet computer to be enclosed by the sleeve according to one embodiment of the present invention.
Figure 2:
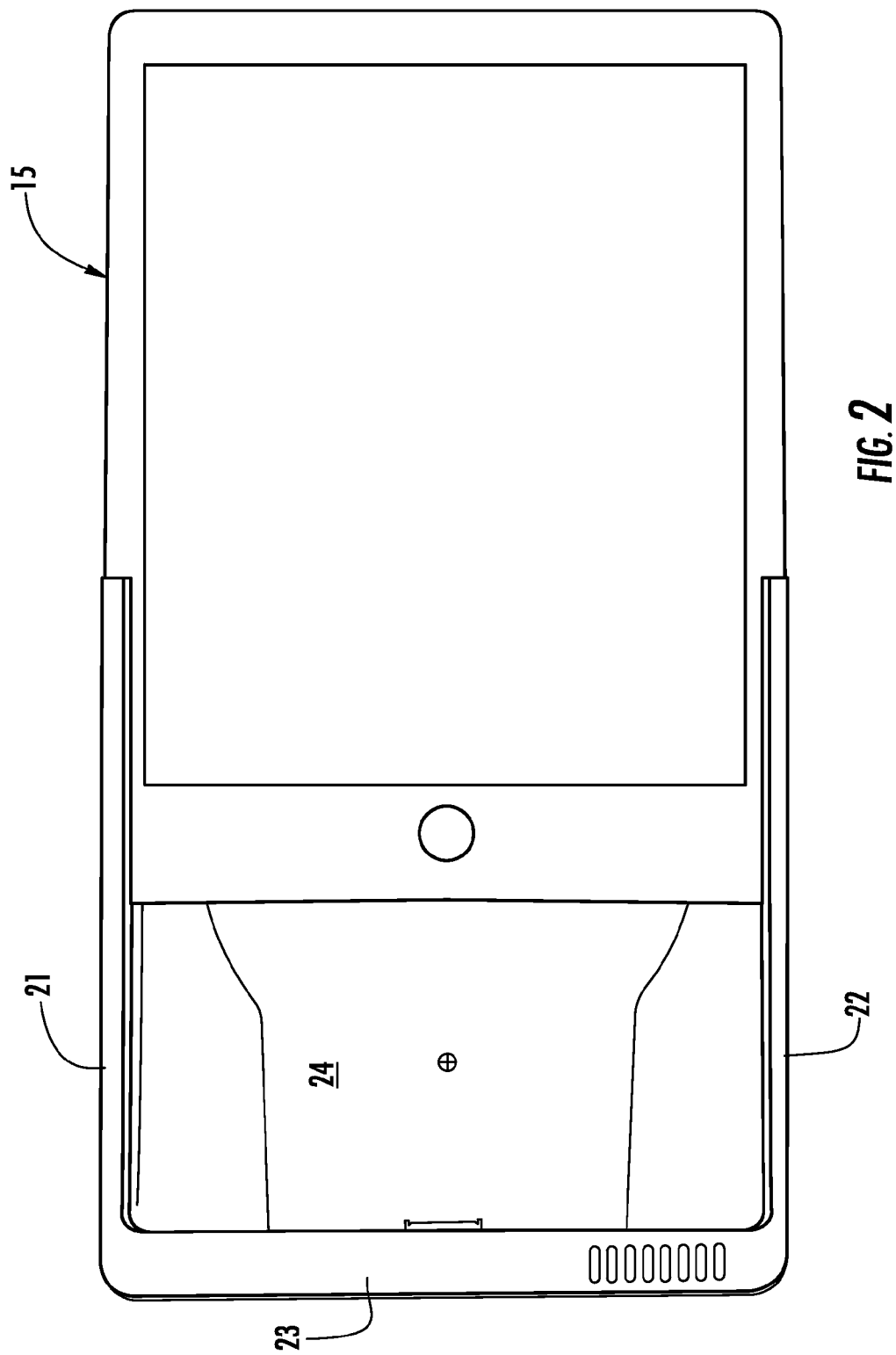
FIG. 2 is a top view showing the tablet computer inserted into and partially enclosed by the first piece of the sleeve.

According to one embodiment, FIG. 1 is a top view showing the sleeve 20 of the display stand 10 (FIG. 3) configured (i.e., sized and shaped) for enclosing an iPad® tablet computer 15. The sleeve 20 comprises a first portion 24 and a second portion 28 that is somewhat smaller than the first portion. First portion 24 and second portion 28 of sleeve 20 are preferably made of a formable, substantially rigid material, such as hard plastic, composite or thin sheet metal. As shown in FIG. 2, the tablet computer 15 is received within the first portion 24 of the sleeve 20 and the second portion 28 is positioned over the free end of the tablet computer that extends beyond the first portion. First portion 24 is provided with peripheral sides 21, 22 and a peripheral end 23 that overlie and enclose the opposite sides and an end of the tablet computer 15. Likewise, second portion 28 is provided with peripheral sides 25, 26 and a peripheral end 27 that overlie and enclose the opposite sides and the other end of the tablet computer 15. First portion 24 and second portion 28 are secured together with tablet computer 15 disposed therein and contained by the peripheral sides 21, 22, 25, 26 and peripheral ends 23, 27 by mechanical fasteners 29, 30, 31. Fasteners 29, 30, 31 are preferably provided with a tamper-proof head that requires a customized tool that is not readily available to others so that the fasteners cannot be easily removed by a potential thief. Alternatively, the fasteners 29, 30, 31 may be positioned on the first portion 24 and the second portion 28 so as to be inaccessible when the sleeve 20 containing the tablet computer 15 is locked in place on the display stand, as will be described.

Figure 3:
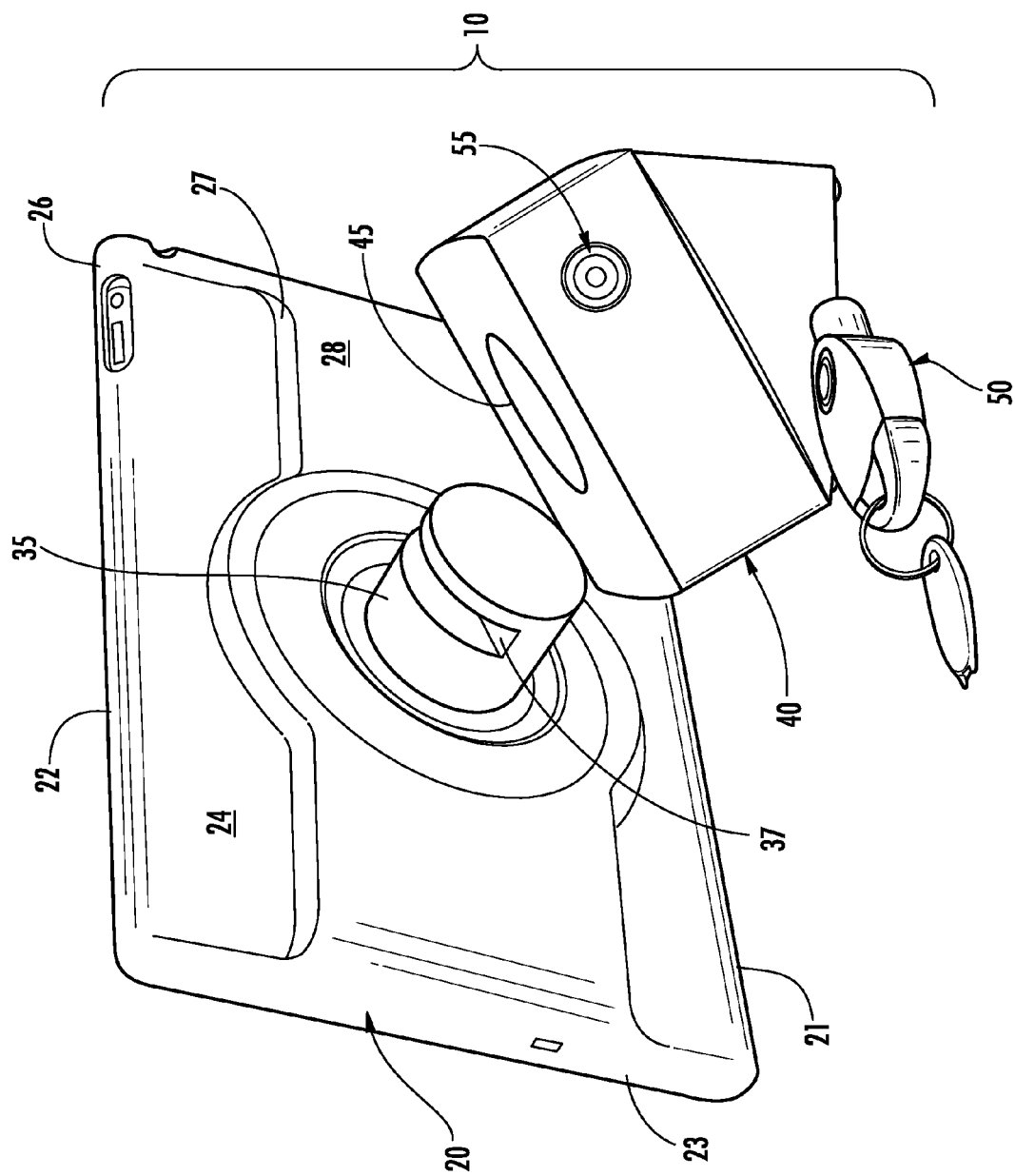
FIG. 3 is an environmental perspective view showing the tablet computer enclosed within the sleeve and positioned to be attached and locked to the base of the security stand.
Figure 4:
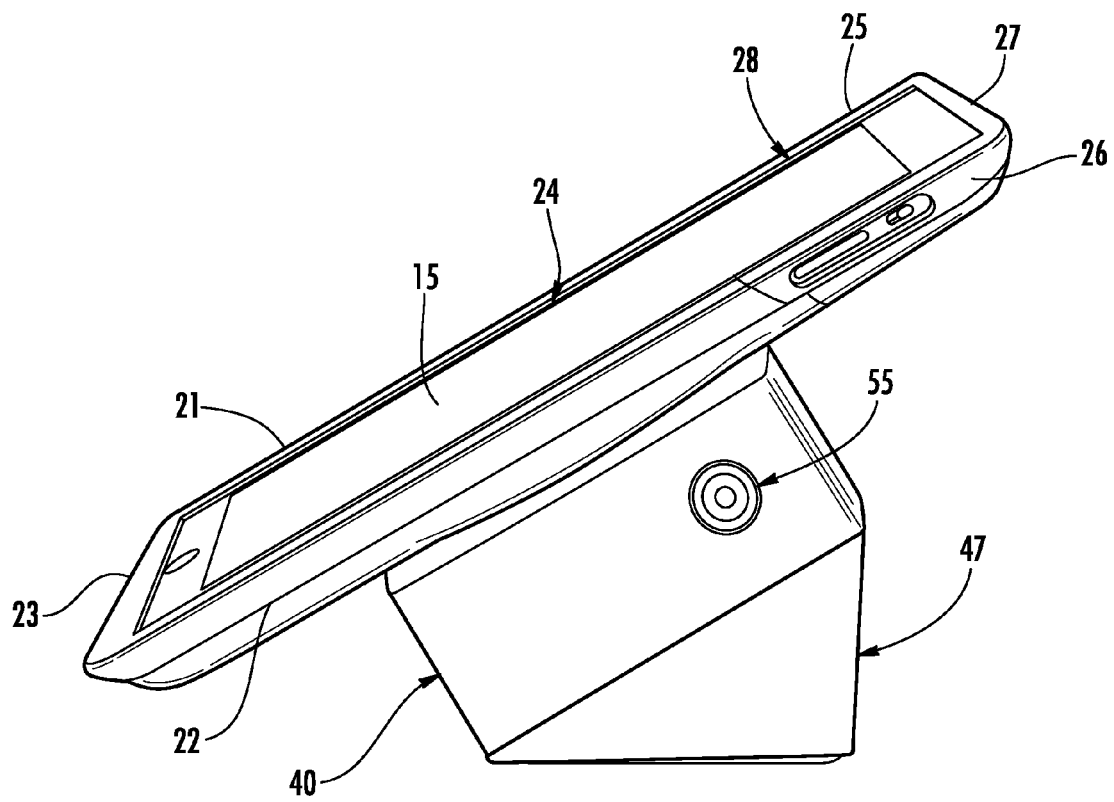
FIG. 4 is an environmental perspective view showing the sleeve containing the tablet computer locked to the base of the security stand.
Figure 5:
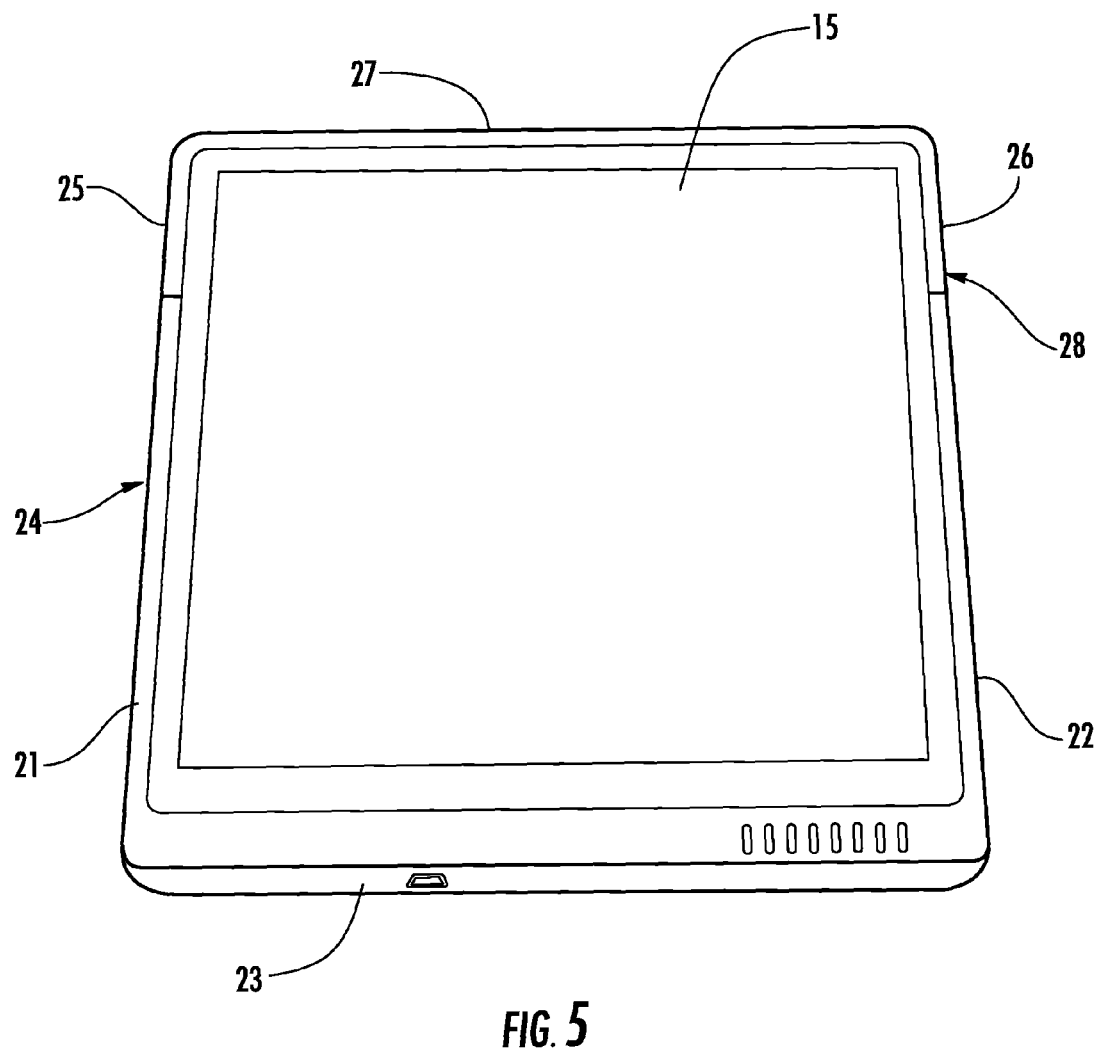
FIG. 5 is a front view of the tablet computer positioned on the base of the security stand in a portrait orientation.
Figure 6:
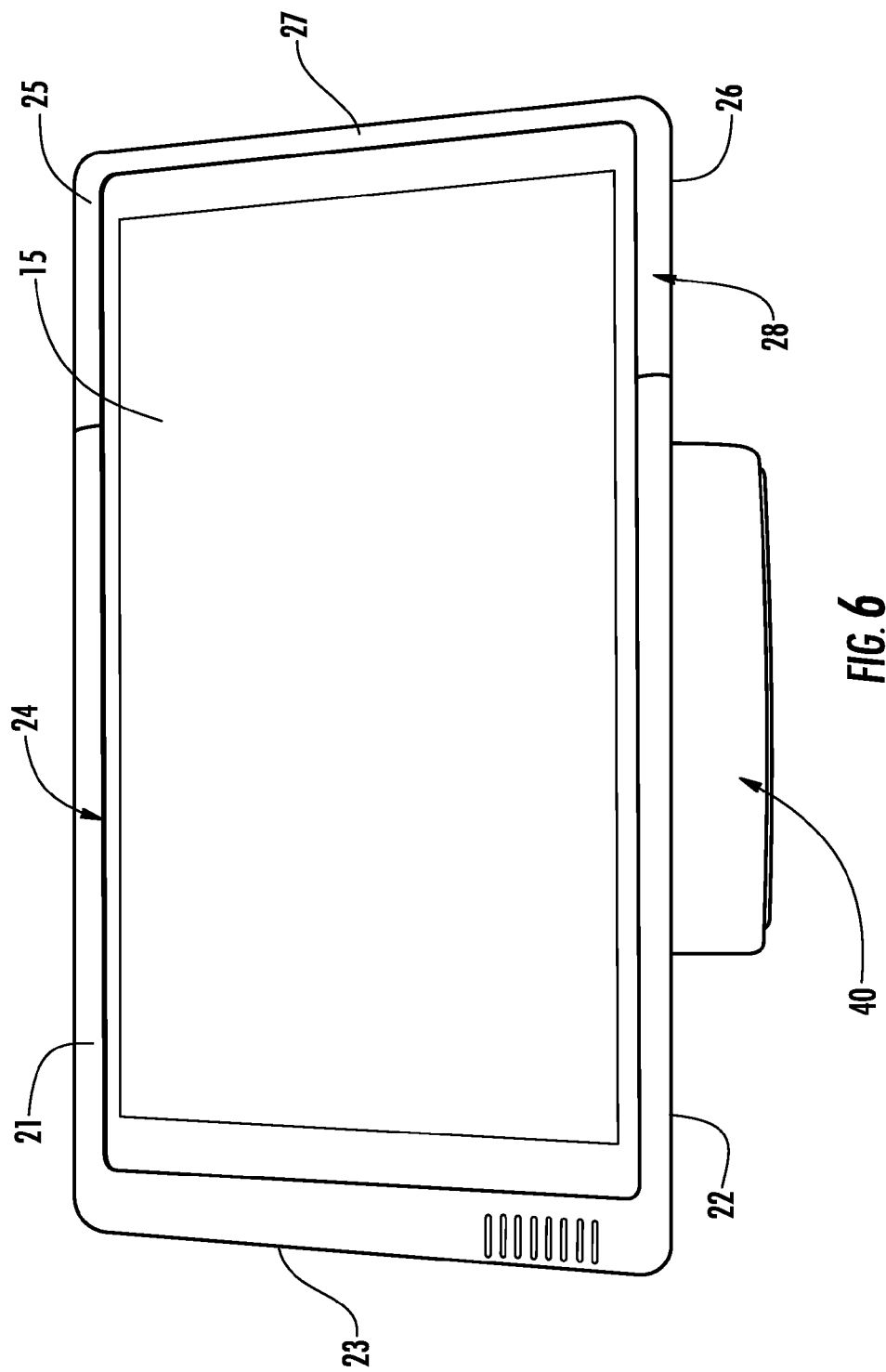
FIG. 6 is a front view of the tablet computer positioned on the base of the security stand in a landscape orientation.

FIG. 3 is an environmental perspective view showing the tablet computer 15 contained within the first portion 24 and the second portion 28 of the sleeve 20 and positioned to be attached to a base 40 of the display stand 10. The base 40 may include at least one opening or recess 45 configured for receiving at least one corresponding locking lug 35 extending from the rear, or underside, of the first portion 24 of the sleeve 20. Locking lug 35 is configured received within the recess 45 of the base 40, and a locking stud, pin, cam, or the like (not shown) disposed within the base is configured to engage a corresponding slot or groove 37 provided on the locking lug. The locking stud engages the groove 37 of the locking lug 35 to lock the sleeve 20 and the tablet computer 15 to the base 40, and alternatively, the locking stud disengages from the groove of the locking lug to unlock the sleeve and the tablet computer from the base. The groove 37 of the locking lug 35 is configured to permit the locking stud to lock the sleeve 20 and the tablet computer 15 on the base 40 of the display stand 10 as desired in a portrait orientation, as illustrated in FIG. 4 and FIG. 5, or alternatively, in a landscape orientation, as illustrated in FIG. 6. It is understood that the illustrated locking lug 35 and groove 37 are not intended to be limiting, as other locking arrangements may be employed. For example, the locking groove 37 may extend about at least a portion of the locking lug 35, and there may be a plurality of locking studs configured to engage the locking groove. Alternatively, the locking lug 35 may be provided with a locking stud, while the base 40 could include a locking groove 37.

In one embodiment, the base may include a mechanical lock for actuating the locking stud, and a key may be used to move the locking stud between the unlocked configuration and the locked configuration. Alternatively, and as shown in FIG. 2, a programmable electronic key 50 and a corresponding programmable electronic lock 55 may be used to actuate the locking stud between the unlocked configuration and the locked configuration. Programmable electronic key 50 and programmable electronic lock 55 are each provided with a security code. The key 50 is positioned adjacent the lock 55 such that the electronics of the key are in data communication with the electronics of the lock. In the event that the security code of the key 50 matches the security code of the lock 55, the key is authorized to transfer electrical power to the lock to operate the locking stud between the unlocked and the locked configurations. Key 50 may transfer electrical power to lock 55 in any known manner. However, in a preferred embodiment, the key 50 transfers electrical power to the lock 55 via inductive transfer. In another embodiment, the locking stud may be mechanically biased, for example, by an elastic member, such as a spring, towards the locked configuration. In this manner, the locking stud is moved against the biasing force of the elastic member from the locked configuration to the unlocked configuration as the locking lug 35 is received within the recess 45 of the base 40 and is biased into the locked configuration when the locking lug is fully seated within the recess. The key 50 and the lock 55 are then used to move the locking stud against the biasing force of the elastic element from the locked configuration to the unlocked configuration. When the key 50 is removed from the lock 55, the locking stud is permitted to move under the biasing force of the elastic element back to the locked configuration.

If desired, the display stand 10 may be provided with an alarm unit 47 disposed within the base and comprising an alarm and monitoring electronics for activating the alarm in the event that the sleeve 20 and the tablet computer 15 are detached from the base in an unauthorized manner. For example, the programmable electronic key 50 may be used to communicate an electrical signal to engage, or "arm," the monitoring electronics of the alarm unit 47. Likewise, the programmable electronic key 50 may further be used to communicate an electrical signal to disengage, or "disarm," the monitoring electronics. When armed, the monitoring electronics monitor a sensor switch, such as a limit switch, operably positioned between the locking lug 35 disposed on the sleeve 20 and the recess 45 formed in the base 40. If the locking lug 35 is removed from the recess 45 without the key 50 first disarming the monitoring electronics, the monitoring electronics of the alarm unit activates the alarm. Once the key 50 has been used to disarm the monitoring electronics, the locking lug 37 can be removed from the recess 45 and the monitoring electronics will not activate the alarm in response to the sensor switch. The alarm unit 47 of the base 40, including the sensor switch, may be provided with electrical power from an external source. Alternatively, or as desired, alarm unit 47 may be provided with an internal replaceable or rechargeable battery since the lock 55 is operated by electrical power transferred from the key 50 and the remainder of the display stand 10 is entirely mechanical.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A display stand for securing a tablet computer from unauthorized removal or theft, the display stand comprising:
   a sleeve configured to at least partially receive a tablet computer therein; and
   a base configured to removably support the sleeve and the tablet computer thereon in a display orientation, the base comprising a lock configured to releasably engage the sleeve, the base configured to engage the sleeve in a locked configuration so as to prevent removal of the sleeve and the tablet computer from the base and to disengage the sleeve in an unlocked configuration so as to allow the sleeve and the tablet computer to be removed from the base, the tablet computer configured to be selectively positioned on the base in the locked configuration in one of a plurality of display orientations,
   wherein the lock is an electronic lock configured to communicate with an electronic key for unlocking the sleeve and the tablet computer from the base.

2. The display stand of claim 1, wherein the sleeve comprises a first portion and a second portion that are configured to engage one another to secure the tablet computer therein.

3. The display stand of claim 2, wherein the tablet computer comprises opposing sides extending between opposing ends, and wherein the first portion and the second portion each comprises peripheral sides and a peripheral end configured to overlie and enclose the opposing sides and one of the opposing ends.

4. The display stand of claim 1, wherein the sleeve comprises a locking lug configured to releasably engage the base.

5. The display stand of claim 4, wherein the base comprises a recess configured to at least partially receive the locking lug therein.

6. The display stand of claim 4, wherein the base comprises at least one locking stud configured to releasably engage the locking lug.

7. The display stand of claim 6, wherein the locking lug comprises a groove configured to be releasably engaged by the at least one locking stud.

8. The display stand of claim 6, wherein the at least one locking stud is configured to be mechanically biased into engagement with the locking lug.

9. The display stand of claim 1, wherein the electronic lock is configured to receive electrical power from the electronic key for operating the electronic lock.

10. The display stand of claim 1, wherein the electronic lock comprises a security code, and wherein the electronic lock is configured to unlock in response to receiving a matching security code from the electronic key.

11. The display stand of claim 1, further comprising an alarm unit disposed within the base, wherein the alarm unit is configured to activate an alarm in the event that the sleeve and the tablet computer are removed from the base in an unauthorized manner.

12. The display stand of claim 11, wherein the alarm unit is configured to communicate with the electronic key for arming or disarming thereof.

13. The display stand of claim 1, wherein the base comprises means for charging the tablet computer or transferring power to the tablet computer.

14. A display stand for securing a tablet computer from unauthorized removal or theft, the display stand comprising:
   a sleeve configured to at least partially receive a tablet computer therein;
   a base configured to releasably engage the sleeve; and
   a lock configured to lock the sleeve and the tablet computer to the base so as to prevent removal of the sleeve and the tablet computer from the base; and
   an electronic key configured to transfer power to the lock to unlock the lock so as to allow the sleeve and the tablet computer to be removed from the base.

15. A method for securing a tablet computer from unauthorized removal or theft, the method comprising:
   positioning a tablet computer within a sleeve;
   locking the sleeve and the tablet computer to the base so as to prevent removal of the sleeve and the tablet computer from the base; and
   selectively positioning the tablet computer on the base in one of a plurality of display orientations while locked to the base
   unlocking the lock with an electronic key so as to allow the sleeve and the tablet computer to be removed from the base.

16. The display stand of claim 1, wherein the base further comprises a switch configured to detect removal of the sleeve from the base.

17. The display stand of claim 1, wherein the plurality of display orientations comprises a landscape orientation and a portrait orientation.

18. The display stand of claim 1, wherein the sleeve is configured to rotate relative to the base about an axis.

19. The display stand of claim 18, wherein each of the plurality of display orientations of the tablet computer is disposed perpendicular to the axis.

20. A display stand for securing a tablet computer from unauthorized removal or theft, the display stand comprising:
a sleeve configured to at least partially receive a tablet computer therein; and
a base configured to removably support the sleeve and the tablet computer thereon in a display orientation, the base comprising a lock configured to releasably engage the sleeve, the base configured to engage the sleeve in a locked configuration so as to prevent removal of the sleeve and the tablet computer from the base and to disengage the sleeve in an unlocked configuration so as to allow the sleeve and the tablet computer to be removed from the base,
wherein the lock is an electronic lock configured to communicate with an electronic key for unlocking the sleeve and the tablet computer from the base.

21. The display stand of claim 20, further comprising an alarm unit disposed within the base, wherein the alarm unit is configured to activate an alarm in the event that the sleeve and the tablet computer are removed from the base in an unauthorized manner.

22. The display stand of claim 20, wherein the tablet computer is configured to be selectively positioned on the base in the locked configuration in one of a plurality of display orientations.

23. The display stand of claim 22, wherein the plurality of display orientations comprises a landscape orientation and a portrait orientation.

24. The display stand of claim 20, wherein the electronic lock comprises a security code, and wherein the electronic lock is configured to unlock in response to receiving a matching security code from the electronic key.

* * * * *

UNITED STATES PATENT AND TRADEMARK OFFICE
CERTIFICATE OF CORRECTION

PATENT NO. : 9,163,433 B2
APPLICATION NO. : 14/059735
DATED : October 20, 2015
INVENTOR(S) : Nicholas M. Sedon Page 1 of 1

It is certified that error appears in the above-identified patent and that said Letters Patent is hereby corrected as shown below:

In the Claims

In column 6, line 58, delete "and" after "base;".

In column 6, line 61, insert --; and-- after "base".

Signed and Sealed this
Twenty-eighth Day of June, 2016

Michelle K. Lee
*Director of the United States Patent and Trademark Office*